United States Patent
Smith

[15] 3,662,252
[45] May 9, 1972

[54] TACHOMETER AND METHOD FOR OBTAINING A SIGNAL INDICATIVE OF ALTERNATOR SHAFT SPEED

[72] Inventor: Otto Joseph Mitchell Smith, 612 Euclid Avenue, Berkeley, Calif. 94708

[22] Filed: June 22, 1970

[21] Appl. No.: 48,075

[52] U.S. Cl. ............................322/89, 322/24, 322/25, 322/31, 324/177
[51] Int. Cl. ...........................................H02p 9/00
[58] Field of Search ................322/20, 23, 24, 25, 27, 28, 322/29, 31, 32, 59, 89, 95, 96; 324/161, 162, 177

[56] References Cited

UNITED STATES PATENTS

| | | | |
|---|---|---|---|
| 3,408,556 | 10/1968 | Gabor | 322/95 |
| 3,110,817 | 11/1963 | Frederick | 322/24 X |

Primary Examiner—Lewis H. Myers
Assistant Examiner—H. Huberfeld
Attorney—Flehr, Hohbach, Test, Albritton & Herbert

[57] ABSTRACT

An improved tachometer which includes an alternator connected to a shaft whose speed is to be measured and which generates an alternating voltage. Electrical circuits perform a non-linear operation on the generated alternating voltage and produce a unidirectional output proportional to the speed of the shaft by order-independent iterative pairwise binary operations. One embodiment of electrical apparatus for performing such operations is a sine wave generator followed by square law operations on the generated voltages followed by an operational summer. Another embodiment includes a square wave generator followed by bridge rectification of the square waves to produce a unidirectional signal followed by a star or tree of diodes to produce an auctioneering circuit which passes the largest rectified voltage. Another embodiment of this invention is a tachometer in which a velocity signal is derived from computations based on the alternator terminal potentials and currents.

25 Claims, 10 Drawing Figures

PATENTED MAY 9 1972

INVENTOR.
OTTO J.M. SMITH

BY Flehr, Hohbach, Vest,
Albritton & Herbert
ATTORNEYS

INVENTOR.
OTTO J. M. SMITH

INVENTOR.
OTTO J.M. SMITH
ATTORNEYS

TACHOMETER AND METHOD FOR OBTAINING A SIGNAL INDICATIVE OF ALTERNATOR SHAFT SPEED

BACKGROUND OF THE INVENTION

This invention pertains to an improved tachometer for use with an alternating current generator for obtaining a signal proportional to the shaft velocity of the alternating current generator which has improved bandwidth and ripple and noise characteristics.

One form of tachometer which is presently available consists of an alternating current generator with a permanent magnet field and an alternating current armature whose shaft is connected to the rotating shaft whose speed is to be measured. The frequency of the generator voltage and the magnitude of the generated voltage are each proportional to the shaft speed. The alternating current voltage is rectified and the output tachometer signal contains a ripple having a frequency double that of the generated frequency. The presence of this ripple can be quite undesirable if the signal is to be used in a control system. For example, if the signal is to be used as a supplementary speed signal to be introduced into the field for excitation of a synchronous alternator, the presence of the ripple places a limitation on the gain of amplifiers to measure the change in shaft velocity and places a limit on the upper frequency or bandwidth of the control system using this velocity signal.

SUMMARY OF THE INVENTION

Accordingly, it is an object of this invention to provide a tachometer which is essentially free of any ripple in the output signal and which has improved bandwidth and speed of response of output signal with respect to shaft velocity changes.

It is another object of this invention to provide an improved tachometer which can be used to measure small changes in shaft speed and which has wide bandwidth and large signal-to-noise ratio.

It is another object of the present invention to provide apparatus to be used in conjunction with a synchronous alternator to deliver a signal proportional to the angular velocity of the shaft of the synchronous alternator.

It is another object of this invention to provide means for generating a multiphase alternating voltage, means for performing a non-linear operation responsive to the multiphase generated voltage and producing a unidirectional output, and means for generating a system output from the unidirectional output by a series of order-independent iterative pairwise binary operations.

Briefly, in accordance with one embodiment of the invention, there is provided means for generating an alternating voltage, means for performing a non-linear operation responsive to the alternating voltage and producing a unidirectional output therefrom, and means for generating a system output from the unidirectional output by a set of order-independent iterative pairwise binary operations.

Additional objects and features of the invention will appear from the following description in which the preferred embodiments of the invention have been set forth in detail in conjunction with the drawings.

DESCRIPTION OF THE PREFERRED EMBODIMENTS

Figure 1:
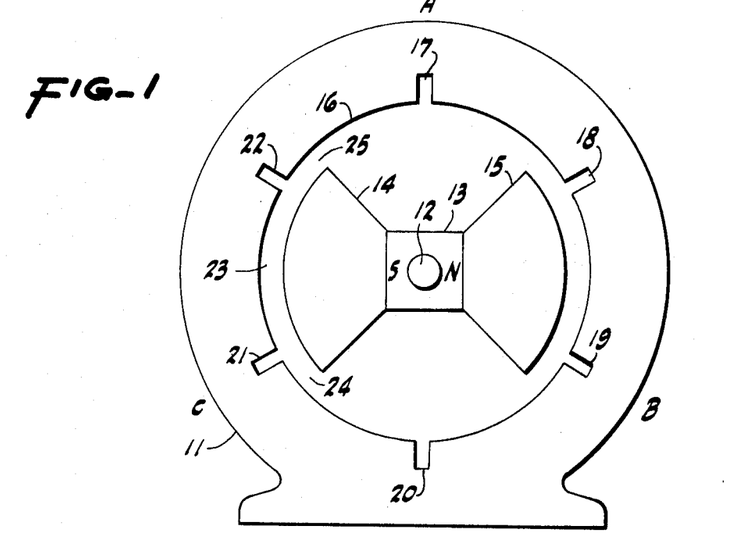
FIG. 1 is a cross sectional view of a permanent magnet tachometer alternator for measuring the speed of a shaft.

Referring now to FIG. 1, there is shown a permanent-magnet alternator which comprises a frame 11 which carries bearings (not shown) for supporting the shaft 12 upon which is mounted a permanent magnet 13 and soft iron pole shoes 14 and 15 which can rotate within the space at the center of frame 11. The inside surface of the stator armature is the cylindrical surface 16 in FIG. 1. In this surface are provided slots 17 through 22, inclusive, which are available for carrying electrical insulated coils. Between the armature surface 16 and the pole shoes 14 and 15 is an air gap which may not be of uniform thickness. As shown in FIG. 1, at the center of the pole the air gap is 23 and at the edges of the pole it is 24 and 25. It is within the scope of this invention to provide a non-cylindrical pole face such that the airgap space at 23 is not equal to the airgap space at 24. Slots 17 and 20 are provided to carry a coil called phase $A$. Slots 19 and 22 are provided to carry a coil designated phase $B$ and slots 18 and 21 are provided to carry a coil designated phase $C$. Either one coil or two separate coils or a center tapped coil may be provided in each pair of slots. The $A$ phase coil mounted in slots 11 and 21 has a voltage generated in it which is proportional to the flux density in the air gap 23, due to the permanent magnet 13 and also proportional to the angular velocity of shaft 12. The wave form of voltage in phases $A$, $B$, and $C$ is the same in each phase but displaced in time, because the distribution of flux across the pole face in FIG. 1 is essentially constant and invariant with time. It is assumed that the loading of the coils which have generated voltage in them in FIG. 1 is not sufficient to produce an appreciable armature reaction effect upon the flux field.

Figure 2:
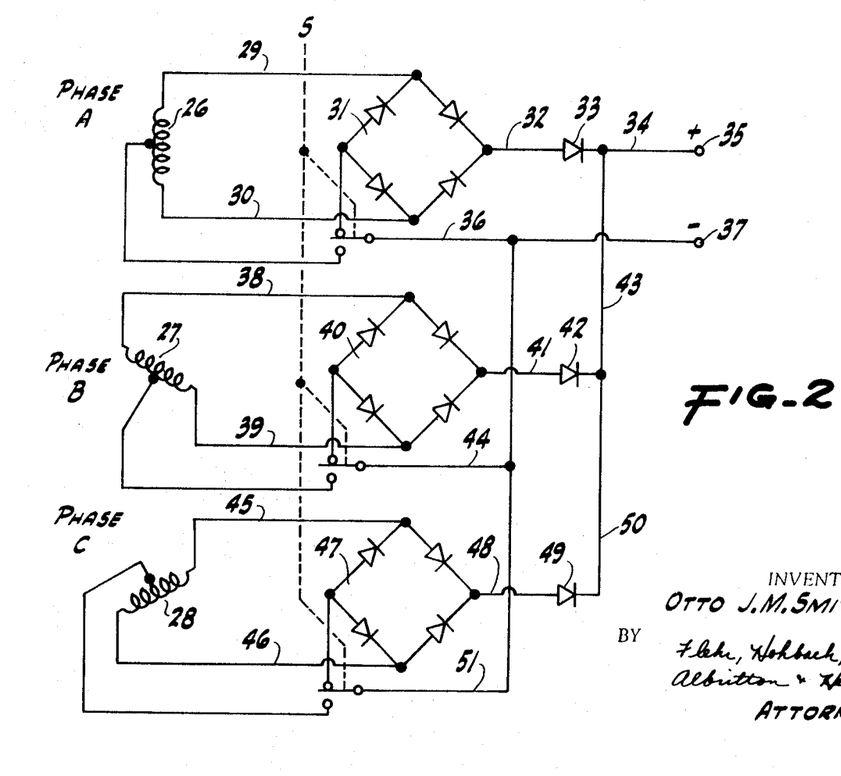
FIG. 2 is a circuit diagram of the connections of the windings of the machine of FIG. 1 to a two-terminal output circuit delivering a signal proportional to shaft angular velocity.

FIG. 2 is a circuit diagram of the connections of the windings in the machine of FIG. 1 and illustrates apparatus for performing order-independent iterative pairwise binary operations on the output of the machine of FIG. 1. One example of what is meant by an order-independent iterative pairwise binary operation is summation. For example, consider the equation $X = A + B + C$. Taking the first pair, $D = (A + B)$. Taking a second pair, $E = (D + C)$. If $X = E$ then $X = ((A + 30 B) + C)$. This is the same result as if B and C were first taken in a pair. For example, $F = (B + C)$, $X = (A + F)$. The result $X$ is the same in both cases. Another example of an order-independent iterative pairwise binary operation is the selection of a maximum of a set of signals. For example, let $Y = \text{Max}(A,B,C,)$. It can be seen that this is the same as $Y \text{Max}(\text{Max}(A,B), C)$ and that this is also the same as $Y \text{Max}(A, \text{Max}(B,C))$ and that this is also the same as $Y = \text{Max}(\text{Max}(A,C),B)$.

FIG. 2 shows the windings 26, 27 and 28 which are placed in the slot pairs marked phases $A,B$, and $C$, respectively, in FIG. 1. Winding 26 is connected by conductors 29 and 30 to a full wave rectifier bridge 31 whose positive polarity output is connected by conductor 32 through diode 33 and conductor 34 to terminal 35, and whose output negative terminal is connected by conductor 36 to terminal 37. Phase $B$ coil 27 is connected by conductors 38 and 39 to a full wave rectifier bridge 40 whose positive output is connected by conductor 41 through diode 42 to conductor 43 which also terminates at terminal 35. The negative output terminal of bridge 40 is connected by conductor 44 to terminal 37. Phase C coil 28 is connected by conductors 45 and 46 to full wave rectifier bridge 47 whose positive output terminal is connected by conductor 48 through diode 49 and conductor 50 to terminal 35. The negative output terminal of bridge 47 is connected by conductor 51 to terminal 37. Diodes 33, 42 and 49 are so polarized that they will carry current from conductors 32, 41, and 48, respectively to terminal 35, but not in the reverse direction. The circuit in FIG. 2 rectifies voltages generated in the three phases in FIG. 1 and delivers to terminals 35 and 37 the largest of each voltage at each instant of time. The diode star terminating at 35 is an auctioneering circuit. The voltage from 35 and 37 is always positive and has a magnitude proportional to the angular velocity of shaft 12.

If the pole faces in FIG. 1 were shaped to produce a sinusoidal variation of flux density in the air gap, then the voltages in the three phases in FIG. 2 would be sinusoidal and the voltage from terminal 35 to 37 would be the composite of six portions of the peaks of sine waves, each portion 60° in duration and the composite having a ripple of six times the fundamental frequency. But the air gap flux in FIG. 1 is pecifically not sinusoidally distributed but instead has almost uniform flux density across the entire pole face. It is within the scope of this invention in order to maintain uniform flux density over nearly the entire span of the pole face in FIG. 1, to provide a greater air gap in region 23 than in regions 24 and 25, to compensate for the different reluctances of the different flux paths through the pole shoe. With constant flux density in regions 24, 23, and 25, the voltage generated in each coil in FIG. 1 has a relatively constant maximum value which persists for a time as long as the pole face is passing under the coil whose voltage is being observed. The three flat-topped voltage waves which are therefore generated in FIG. 1 are rectified in FIG. 2 to provide three flat-topped voltage waves on conductors 32, 41 and 48. The voltage at terminal 35 is essentially constant since it does not vary in time except for the very short interval of time during which the diodes 33, 42, and 49 are commutating from one flat-topped wave to the next flat-topped wave.

In FIG. 2, it is within the scope of this invention to omit diodes 33, 42, and 49, and connect conductors 32, 41, and 48 directly to terminal 35. The six right hand diodes in the three bridges form a new star connection terminating at 35 which is also an auctioneering circuit. It is also within the scope of this invention to connect 36, 44, and 51 from terminal 37 to centertaps on the three windings 26, 27, and 28, respectively to provide full wave rectification instead of bridge rectification. This is accomplished by throwing the switch S to the lower position in FIG. 2.

Figure 3:
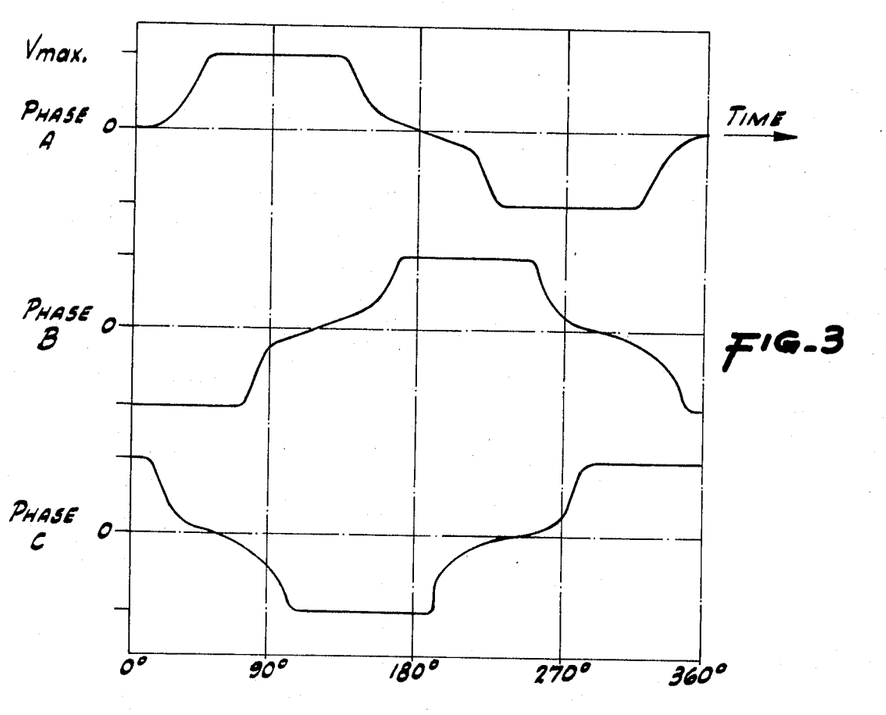
FIG. 3 is a plot of the voltage generated in the 3 windings of the tachometer of FIG. 1 as a function of time.

FIG. 3 shows the wave forms of the voltages available at terminal 35 from each of the commutating diodes, 33, 42, and 49, respectively. The phase A voltage which is generated in winding 26 is the top oscillogram in FIG. 3. Time in FIG. 3 is measured from the stroboscopic position shown in FIG. 1. The A phase has a voltage which rises from 0 volts to approximately maximum voltage in 45° and remains at maximum voltage until 135° after which it falls to 0 voltage at 180°. The next half cycle has a similar waveform but reversed polarity. The voltage in phase B has the same waveform as that in phase A but lags behind it by 120°. The voltage in phase C shown in the bottom oscillogram of FIG. 3 has the same waveform as the voltage in phase A but leads it in time by 120°. The three voltages shown in FIG. 3 are the voltages generated within the coils 26, 27, and 28.

Figure 4:
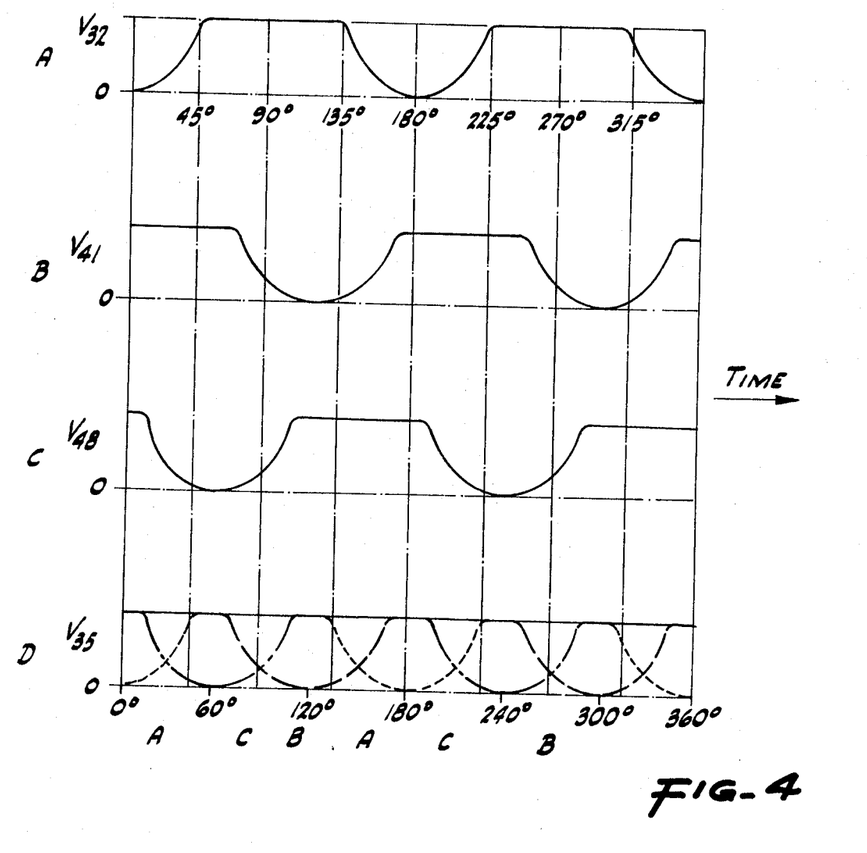
FIG. 4 is a plot of several of the voltages available at different points in the circuit of FIG. 2.

FIG. 4 shows the rectified voltages available after the bridge rectifiers in FIG. 2. The top three curves in FIG. 4 are for phases A, B, and C, respectively and are labelled voltage at 32, voltage at 41, and voltage at 48, respectively with respect to common ground terminal 37 in FIG. 2. The bottom oscillogram in FIG. 4 is labelled voltage at terminal 35 for FIG. 2. This oscillogram is formed by the composite of the largest voltages at each instant of time considering the three top oscillograms in FIG. 4. For example, at time 0°, phase B has the largest voltage and it appears on terminal 41 and is connected through diode 42 to terminal 35. Phase B continues to have the largest voltage until the time of 60°. Between times of 45° and 75° both phase A and phase B appear to have the same maximum voltage, but if phase A voltage is rising imperceptably during the same interval of time, and if the waveforms are identical, then commutation from the maximum voltage of phase B being transmitted to terminal 35 will occur at approximately 60° of time, after which phase A voltage is transmitted to 35.

Phase A will continue to deliver maximum voltage until 120°, at which time the diodes will commutate from phase A to phase C. Phase C will continue to deliver maximum voltage until 180°, when commutation will occur back to phase B. Phase B will continue to deliver maximum voltage until 240°, at which time commutation will occur to phase A. Phase A will continue to deliver maximum voltage until approximately 300°, at which time commutation will occur to phase C.

It can be seen from the bottom oscillogram in FIG. 4D that the voltage on terminal 35 is extremely constant and is a desirable improved signal measuring the shaft speed of the generator in FIG. 1 and providing a signal of improved signal-to-noise ratio of diminished ripple and of greatly increased bandwidth. It can be seen that if the velocity of shaft 12 in FIG. 1 were to increase suddenly that each oscillogram in FIG. 4 which was not instantaneously 0 would increase proportionally, and that particular voltage which was at its maximum value would increase to a new maximum value proportional to the new shaft speed of shaft 12. This change would occur coincidentally with the change in shaft speed and therefore the increase in the voltage on terminal 35 would occur simultaneously and instantaneously in FIG. 4. For this reason the response of the output circuit in FIG. 2 will respond to extremely high frequency variations in the shaft speed of shaft 12, and the bandwidth of the tachometer signal is greatly expanded over the bandwidth of conventional tachometer signals.

Figure 5:
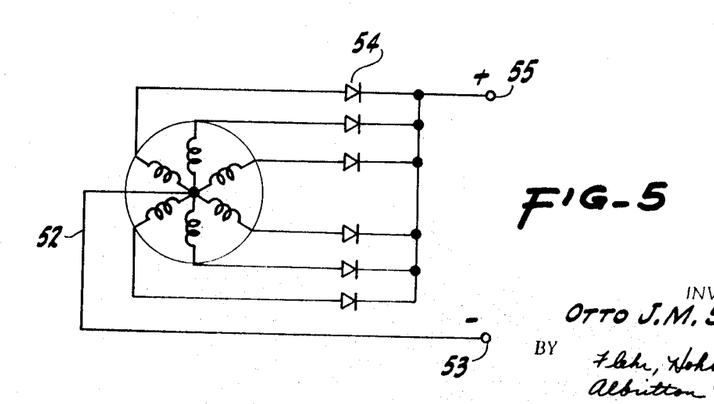
FIG. 5 is an electrical diagram of an alternate connection of six windings which can be installed in the structure of FIG. 1.

FIG. 5 shows another embodiment for the connection between the windings in FIG. 1 and the useful output tachometer signal. In FIG. 5 each pair of diagonally opposite slots contains a center tapped winding connected so that all the center taps are connected together and are connected by conductor 52 in FIG. 5 to output terminal 53, and the remaining terminals of the six half-windings form a conventional six-phase circuit. This conventional six-phase circuit delivers six square-topped alternating waves.

The six phases in FIG. 5 are connected respectively to the six anodes of the six rectifiers 54 whose six cathodes are connected together and connected to terminal 55. The polarity of the signal voltage delivered from the tachometer in FIG. 5 is therefore positive on terminal 55 and negative on terminal 53. Although the circuit diagram is a conventional six-phase rectifier connection in FIG. 5, the waveform of the voltages generated in the six phases is not sinusoidal but is instead the flat-topped wave shown in FIG. 3. Each of these flat-topped waves is rectified by one of the rectifiers 54 and the most positive voltage from each of these flat-topped waves is delivered to terminal 55. The voltage waveform on terminal 55 in FIG. 5 is therefore the same as that shown in the bottom oscillogram in FIG. 4D marked "Voltage on Terminal 35". It can be seen that the output voltage is formed of six flat-top segments in each 360° of electrical rotation of shaft 12. FIGS. 2 and 5 are equivalent in terms of electrical performance and control theory performance. They differ only in the number of diodes required and the connections to the windings in the slots in FIG. 1.

With regard to FIG. 1 the pole faces have been shown as subtending approximately 90°. The wave forms of generated voltages shown in FIG. 3 have flat tops of approximately 90° also. It can be seen from the oscillogram of voltage on terminal 35 shown on FIG. 4D that the minimum span for the flat tops of the generated voltage waves and the minimum span for the constant flux density portion of the pole face should be at least 60° for the three phase full wave connections shown in FIG. 2 and 3.

For a full wave two-phase generator or for a center-tapped star halfwave rectifier on a four-phase generator, the minimum angle for the constant voltage portion of the voltage wave and the minimum angle for the constant flux density portion of the pole face is 90°.

For a twelve-phase star machine with half-wave rectification, the minimum angle of constant flux density can be reduced to slightly over 30°.

Figure 6:
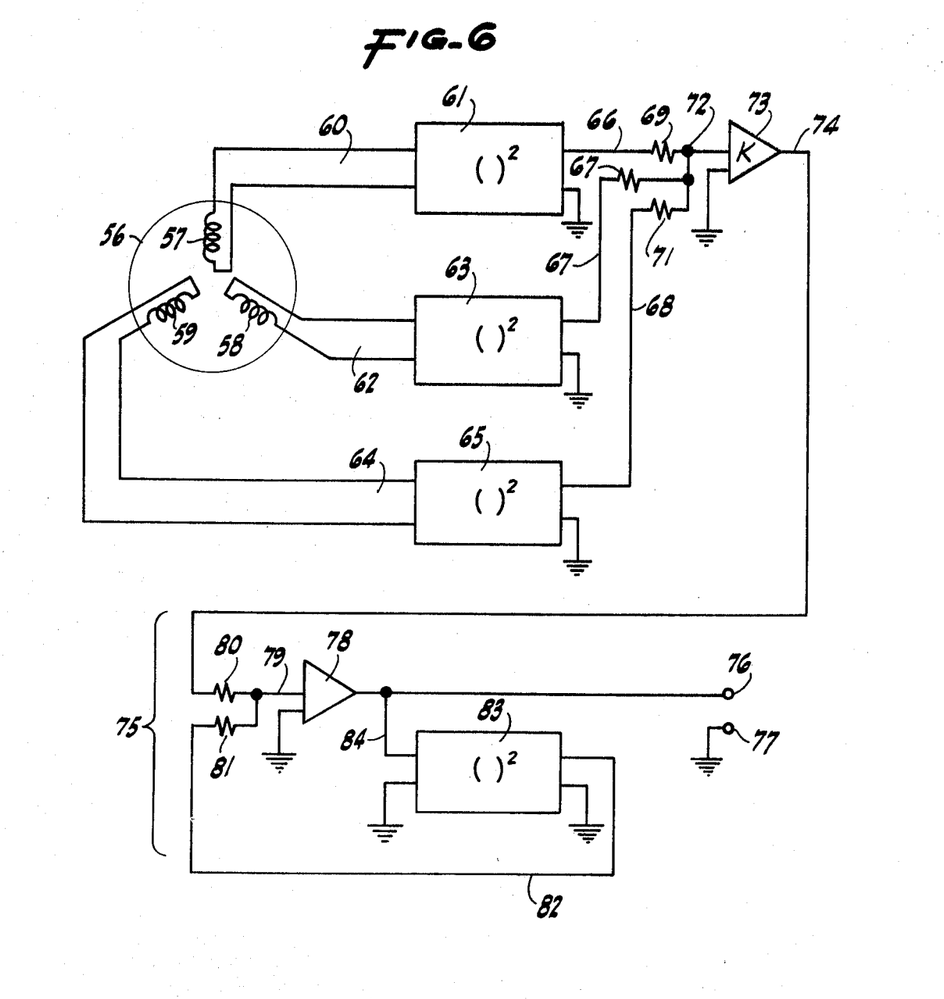
FIG. 6 is a circuit diagram of an embodiment of this invention applied to the signals available from a conventional three-phase-sine-wave tachometer-alternator.

FIG. 6 shows the block and wiring diagram of an embodiment of this invention applied to a sine-wave tachometer generator. A permanent magnet sine wave tachometer generator 56 has its shaft connected to the shaft of a machine whose angular velocity is to be determined. Generator 56 contains multi-phase output windings which in the preferred form are three windings located 120 electrical degrees from each other and containing a conventional three-phase sinusoidal set of voltages. These three windings are designated 57, 58 and 59 in FIG. 6. Winding 57 is connected by circuit 60 to the input to a squaring module 61. Winding 58 is connected by circuit 62 to the input to squaring module 63 and winding 59 is connected by circuit 64 to the input to squaring module 65. Squaring modules 61, 63 and 65 are of a form which is well-known to analog computer engineers and can be, for example, of the type manufactured by Burr-Brown Co. The outputs of squaring modules 61, 63 and 65 appear respectively on circuits 66, 67 and 68. These are each connected to one terminal of resistors 69, 70 and 71 and the other terminals of these three resistors are connected together at terminal 72 to form a resistive adder network. Terminal 72 is the input to a fixed-gain inverting operational amplifier 73 whose gain $K$ is set by negative feedback.

The output of operational amplifier 73 appears on circuit 74 which is provided as the input to a square rooting module 75. The output of the square root computation appears between terminal 76 and a ground terminal which is designated 77. The square rooting module contains internally an operational amplifier 78 whose input terminal 79 has connected to it two summing resistors, 80 and 81. Summing resistor 81 is a feedback resistor which is supplied by circuit 82. Resistor 80 is the input resistor which is supplied by the output circuit 74 from operational amplifier 73. A feedback squaring module 83 is provided with an input 84 which is connected to the output of operational amplifier 78 and to terminal 76. The output of squaring module 83 appears on circuit 82 and provides the feedback signal through resistor 81 to input 79 of operational amplifier 78. It can be seen that the connection of squaring module 83 in negative feedback around operational amplifier 78 provides the inverse function, namely the square root function between the signal on circuit 74 and the signal on terminal 76.

In FIG. 6 the three analog squaring modules 61, 63 and 65 perform the operation of squaring the sine waves available on circuits 60, 62 and 64 and the amplifier 73 adds these three squared sine waves together to produce a signal which has no ripple and exceptionally wide bandwidth, and is proportional to the square of rotor velocity. In order that the output signal be linearly related to shaft velocity and consequently to the amplitude of the sine waves in windings 57, 58, and 59, the square root module 75 is provided so that the signal on terminal 76 is also a constant without ripple and is proportional to the angular velocity of the shaft of the tachometer 56.

Figure 7:
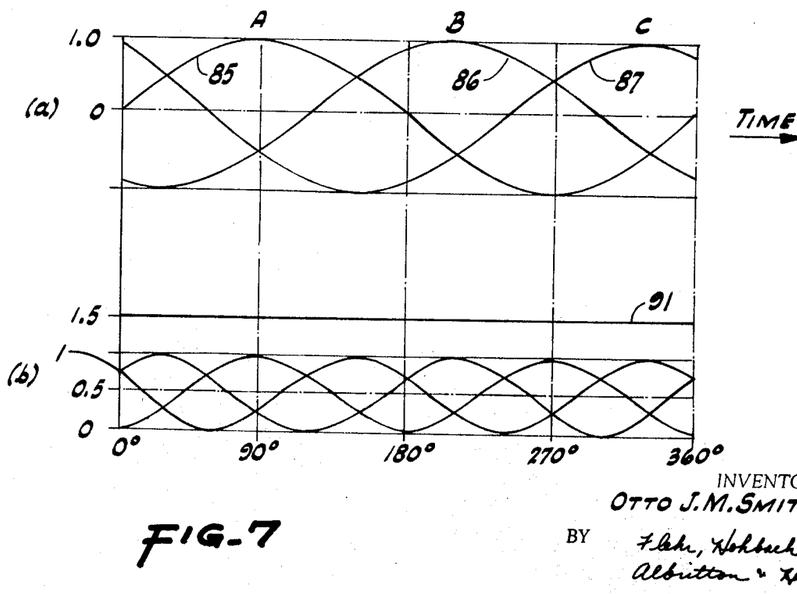
FIG. 7 is an oscillogram of the voltages present in the circuit of FIG. 6.

FIG. 7 shows the time progress of the signals in FIG. 6. The top oscillogram in FIG. 7 shows the sinusoidal waves from phases $A$, $B$, and $C$ designated waves 85, 86 and 87, respectively. These waves are preferably low distortion sine waves of equal amplitudes and accurately phased 120° from each other. The outputs of the three squaring modules in FIG. 6 are shown in FIG. 7 in the lower oscillogram marked FIG. 7-b. Both sets of oscillograms in FIG. 7 have been normalized. The top set of oscillograms have been normalized to a peak value of the sine wave 1. The square of a peak sine wave of 1 is a sine wave with peak-to-peak variation from 1 to 0 and with a frequency which is double the fundamental frequency. The wave which is generated by the square of the phase $A$ wave 85 is shown in FIG. 7-b as wave 88. The wave which is the square of the phase $B$ wave 86 is shown in FIG. 7-b as wave 89. The wave which is the square of phase $C$ wave 87 is shown in FIG. 7-b as wave 90. These are the three waves presented to the summing resistors 69, 70 and 71 in FIG. 6. The sum of these three sine waves, each of which varies between 1 to 0, is a constant of magnitude 1.5 which is shown as wave 91 in FIG. 7. It can be seen that there is no ripple content in the sum wave 91 and that it therefore has extremely high bandwidth in responding to variations in shaft angular velocity of the tachometer 56 in FIG. 6.

Figure 8:
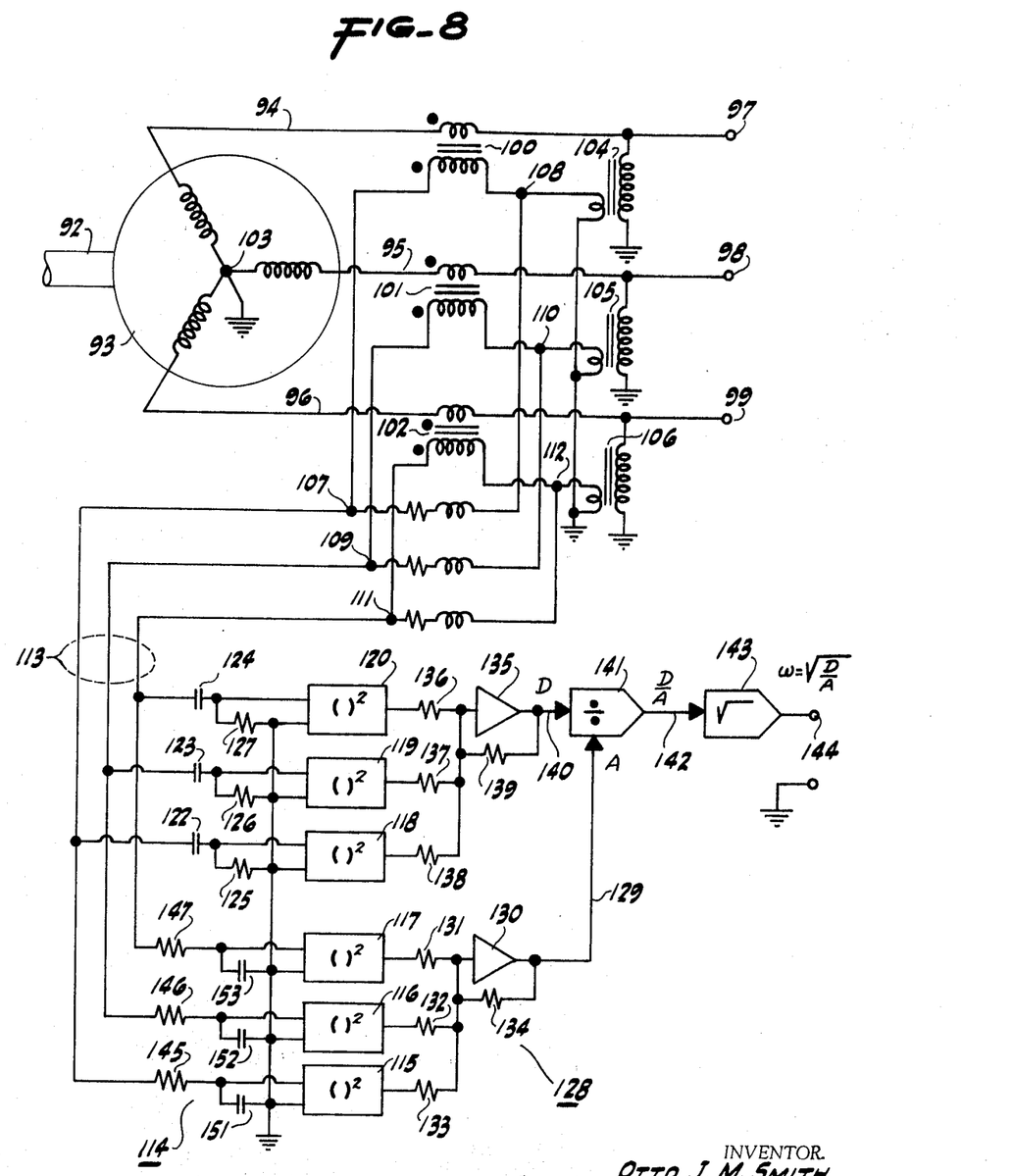
FIG. 8 is an embodiment of this invention which utilizes the voltages and currents measurable at the terminals of a synchronous alternator to compute the angular velocity of the shaft of the synchronous alternator.

FIG. 8 is another embodiment of this invention in which a tachometer or velocity signal is derived from computations using the alternator terminal potentials and currents. In FIG. 8, a rotating shaft 92 drives the alternator 93, whose armature has terminals 94, 95 and 96. The alternator delivers power to a power transformer (not shown) connected to terminals 97, 98 and 99. Between terminal 94 and terminal 97 is connected in series the primary of current transformer 100. Between terminals 95 and 98 is connected the primary of a current transformer 101. Between terminals 96 and 99 is connected the primary of a current transformer 102. The center tap of the armature of alternator 93 is usually grounded through appropriate current limiting reactors and fault sensing equipment. These are not shown in FIG. 8. Shown, however, is the center tap of alternator 93 grounded at terminal 103. Between terminal 97 and ground is connected in series the primary winding of a potential transformer 104. Between terminal 98 and ground is connected the primary of potential transformer 105; and between terminal 99 and ground is connected the primary of potential transformer 106. Three equal impedances of value $R + jX$ are available. They are connected in series, respectively, between terminals 107 and 108, between terminals 109 and 110, and between terminals 111 and 112. The secondary of potential transformer 104 is connected between terminal 108 and ground. The secondary of potential transformer 105 is connected between terminal 110 and ground. The secondary of potential transformer 106 is connected between terminal 112 and ground. These connections are such that if there were no current flowing through the impedances, the potentials of terminals 107, 109 and 111 would be proportional to the terminal voltages on the alternator, and would be in phase with them. The secondary of current transformer 100 is connected between terminals 107 and 108 in such a polarity that a current proportional to the current between terminal 94 and terminal 97 flows through the secondary of current transformer 100 and through the impedance $R + jX$ which is also connected between terminals 107 and 108. The secondary of current transformer 101 is connected between terminals 109 and 110 with such a polarity that a current flows through this secondary and through the impedance which is also connected between terminals 109 and 110. The secondary of current transformer 102 is similarly connected between terminals 111 and 112.

Each potential transformer, 104, 105, and 106, has a ratio of primary turns to secondary turns of $n$. Each current transformer 100, 101, and 102, has a ratio of secondary turns to primary turns of $m$. The voltage is therefore reduced by the ratio $1/n$ in going from primary to secondary, and the current is therefore reduced by the ratio $1/m$ in going from primary to secondary. The secondary connections in FIG. 8 are an analog of the vector diagram within the generator, 93. Terminals 108, 110 and 112 are a low voltage model of the voltage phasors in both magnitude and phase angle for the voltages on terminals 94, 95 and 96. The voltages on terminals 107, 109 and 111 are a low voltage model of the voltage behind quadrature-axis synchronous reactance in alternator 93. The value of $R$ is chosen to be equal to the resistance per phase of alternator 93 times the ratio $m/n$. The value of $X$ is chosen to be equal to the synchronous quadrature reactance of alternator 93 times the ratio $m/n$. The voltage drop through each impedance in FIG. 8 is therefore proportional to the product of armature current times quadrature axis impedance. It is reduced in magnitude by the same ratio as the potential transformers reduce the terminal voltage. These connections in FIG. 8 therefore produce on terminals 107, 109 and 111 the model of the voltage behind quadrature axis reactance within the alternator. This model voltage has an instantaneous phase and frequency approximately equal to the instantaneous phase and frequency of the field *mmf* and apparent open-circuit armature voltage in alternator 93 and in particular the phase of the voltages on terminals 107, 109 and 111 is approximately in phase with the mechanical motions of the shaft, 92. The frequency of the voltages on terminals 107, 109 and 111 is therefore an accurate measure of the velocity of shaft 92.

The lower portion of the circuit of FIG. 8 is a frequency meter designed to measure the frequency of the voltages on terminals 107, 109 and 111 in such a manner that it is a measure of the angular velocity of shaft 92 with a minimum of ripple and noise, and with a wide bandwidth and fast response to transients. The three phase circuit 113 from terminals 107, 109 and 111 goes to the inputs of a set of low-pass filters 114 whose outputs supply voltage to the inputs of three squaring modules 115, 116 and 117. Another three squaring modules 118, 119 and 120 have inputs from phase-leading networks 121 consisting of series capacitors 122, 123, and 124 which are connected between the inputs of the second three squaring modules and the circuit 113. Resistors 125, 126 and 127 are connected respectively between input and ground of squaring modules 118, 119 and 120. The network consisting of the capacitor 122 and the resistor to ground 125, is a phase leading network whose output calculates the derivative of the voltage on the circuit from terminal 107. Likewise, capacitor 123 in conjunction with resistor 126 calculates the derivative of the voltage on terminal 109; and capacitor 124 in conjunction with resistor 127 calculates the derivative of the voltage on terminal 111. These three derivatives are the inputs to squaring modules 118, 119 and 120. All the squaring modules are of the type commercially available as, for example, Burr-Brown, model 9875/19 followed by operational amplifier 3064/15 which is described in the Burr-Brown Fall, 1968 catalogue No. L1-2208 on Page 17.

An operational adder, 128, calculates the magnitude of the voltage on circuit 113 after low-pass filtering and delivers this magnitude on conductor 129. The operational adder 128 consists of an operational amplifier, 130, with an input connected to four resistors, 131, 132, 133 and 134. The other terminal of resistor 131 is connected to the output of squaring module 117; the other terminal of resistor 132 is connected to the output of squaring module 116. The other terminal of resistor 133 is connected to the output of squaring module 115. The other terminal of resistor 134 is connected to the output of operational amplifier 130. This composite of connections produces a summer which adds together the outputs of the squaring modules and which delivers on circuit 129, which is connected to the output of operational amplifier 130, a signal designated $A$, which is proportional to the square of the magnitude of the filtered voltages on three-phase circuit 113.

Another summing amplifier consists of operational amplifier 135 whose input is connected to four resistors 136, 137, 138 and 139. The other terminals of resistors 136, 137 and 138 are connected to the outputs of squaring modules 120, 119 and 118, respectively. The other terminal of resistor 139 is connected to the output of operational amplifier 135, which output is connected to circuit 140 and has a voltage on it designated by D. The composite of elements 135 through 140 inclusive form another summer which calculates the square of the magnitude of the three-phase voltage resulting from the differentiation of the voltages on circuit 113.

Block 141 is an operational divider receiving its numerator input from circuit 140 and receiving its denominator input from circuit 129 and delivering an output designated ($D/A$) on circuit 142. Block 141 is a conventional circuit with conventional components as, for example, the components and circuits given in the Burr-Brown multiplier catalogue No. PDS-201A dated Apr. 1968, wherein on Page 3, FIG. 1 there is shown a divide mode interconnection using Burr-Brown standard modules. Block 143 is a square-root function generator receiving an input from circuit 142 and delivering an output on circuit 144. This square root is obtained by means of a squaring module in negative feedback around an operational amplifier. Suitable commercial modules and circuits are given in the Burr-Brown squaring module catalogue. Circuit 144, which is the output of the square root block 143, delivers a voltage for control purposes proportional to shaft speed and is the useful output voltage of this tachometer embodiment. This voltage is designated $\omega = \sqrt{D/A}$.

Let $\omega$ denote the angular frequency of the voltage on terminals 107, 109 and 111. Let $V$ represent the peak magnitude of the sinusoidal voltage on terminals 107, 109 and 111. The resistances 145, 146, 147, 125, 126 and 127 are of equal magnitude and shall be designated by small $r$. The capacitors 151, 152, 153, 122, 123 and 124 are all of equal magnitude and shall be designated by $c$. The time constant $T$ shall be defined as $$T = rc$$

The output voltage $A$ appearing on circuit 129 in FIG. 8 is equal to $$A = K \frac{1.5|V|^2}{(1+\omega^2 T^2)}$$

The three squaring modules provide the term $1.5 |V^2|$. The three lowpass filters provide the term $1/(1 + \omega^2 T^2)$ where $\omega$ is the angular frequency of the voltage presented to the filters and $T$ is the time constant of the filters. The gain $K$ is provided by the buffer amplifier consisting of operational amplifier 130 and feedback resistor 134. The feedback resistor 134 can be adjusted to provide a desirable value for the constant $K$.

The voltage on circuit 140 is designated $D$ and is equal to $$D = k \frac{1.5|V|^2 \omega^2 T^2}{(1+\omega^2 T^2)}$$

The term $1.5 V^2$ comes from the summation of the outputs of the three squaring modules 118, 119 and 120. The term $\omega^2 T^2/(1 + \omega^2 T^2)$ comes from the phase lead filters with components 122 through 127 inclusive. The term $k$ comes from the gain of operational amplifier 135 with feedback resistor 139. The magnitude of feedback resistor 139 can be selected to adjust the magnitude of $k$ to a desirable value.

The voltages $A$ and $D$ for which equations have been written above are presented to the operational divider 141 to deliver on circuit 142 $D/A$ which is equal to $$\frac{D}{K} = \left(\frac{k}{K}\right) \omega^2 T^2$$

By adjusting feedback resistors 134 and 139 it is possible to set $(K/k) = T^2$. When $(K/k = T^2$, then $$(D/A) = \omega^2$$

and $$\omega = \sqrt{(D/A)}$$

Figure 9:
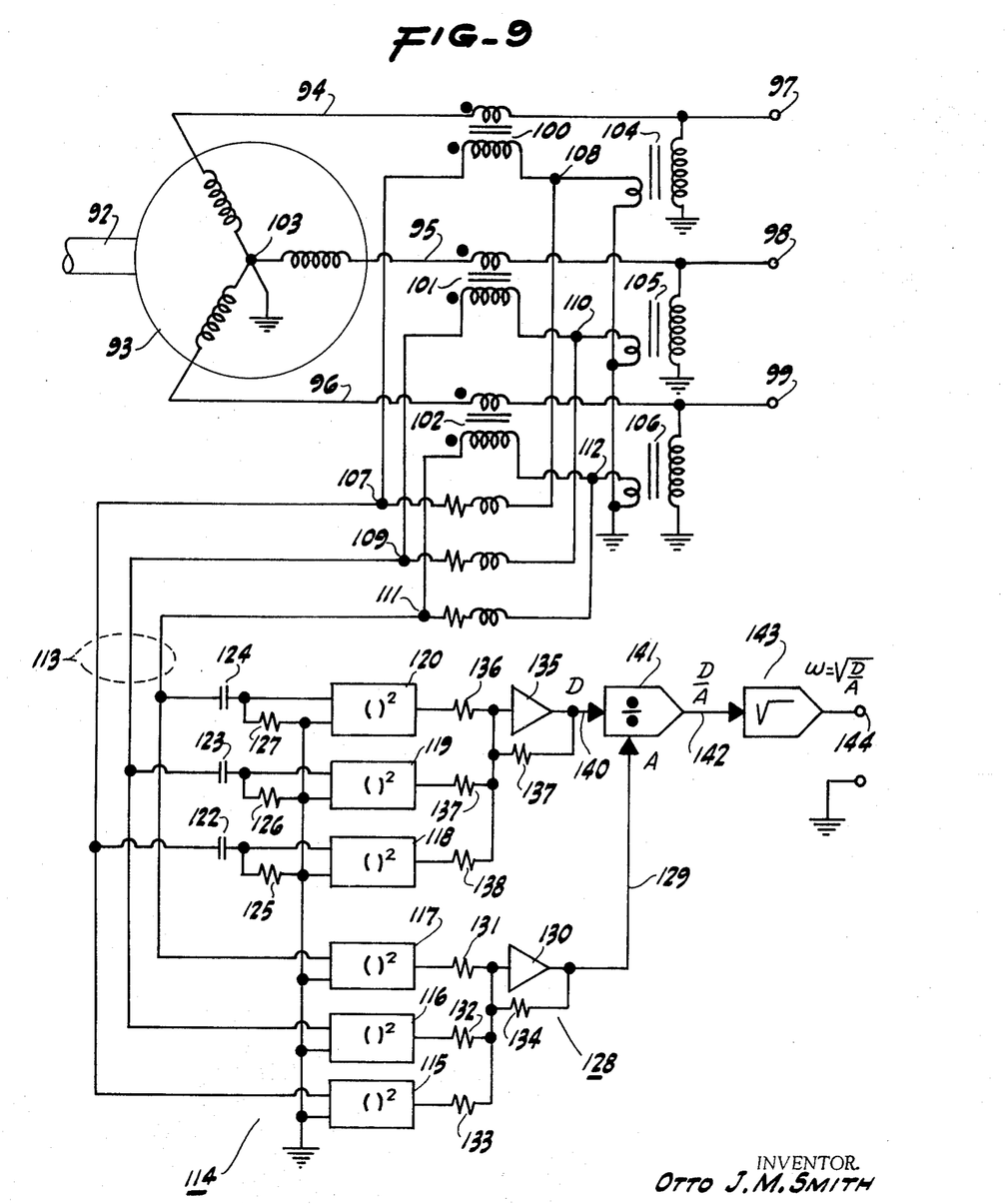
FIG. 9 is similar to FIG. 8 except that phase lag filters are not utilized.

It is within the scope of this invention to omit the phase lag filters in FIG. 8 having components 151, 152, 153, 145, 146 and 147, respectively and make direct connections of the three-wire circuit 113 to the inputs of operational squaring modules 115 through 117 as shown in FIG. 9 such that the output voltage $A = K \, 1.5 |V|^2$. In this case $$(D/A) = (k/K) \, \omega^2 T^2/(1 + \omega^2 T^2).$$

If $T$ is so chosen that $\omega^2 T^2$ is small compared to 1, then the error produced by considering the function $1 + \omega^2 T^2$ as essentially equal to one is negligible. In this latter case, however, the voltage on circuit $D$ is significantly attenuated due to the amplitude loss through the phase lead networks.

In the former case in FIG. 8 is which the phase lag filters prior to squaring modules 115, 116 and 117 are included in the circuit, it is possible to operate in the desirable condition where $T$ has been chosen to be equal to $1/\omega$ and the attenuation in the phase lead networks is approximately 3 dB and the attenuation in the phase lag networks is also approximately 3 dB so that the signals presented at both $D$ and $A$ are of large magnitude and therefore relatively unaffected by noise and spurious pick3up signals.

It can be seen that the embodiment disclosed in FIG. 8 will produce at terminal 144 a signal proportional to the angular velocity of the voltage behind quadrature axis reactance and therefore will deliver a signal essentially equal to the angular velocity of the shaft 92. This signal has low ripple and wide bandwidth and rapid response to dynamic changes in the velocity of shaft 92.

In FIG. 8, it is within the scope of this invention to adjust the value of the reactance $X$ to consider the fact that the transient reactance is less than the synchronous reactance. The signal $\omega$ on 144 is desirable for use in supplementary excitation signals and in optimal excitation controls for damping transient oscillations in synchronous alternators. The value of $X$ may be adjusted for minimum error in the velocity measurement at 144 during rapid velocity changes.

Figure 10:
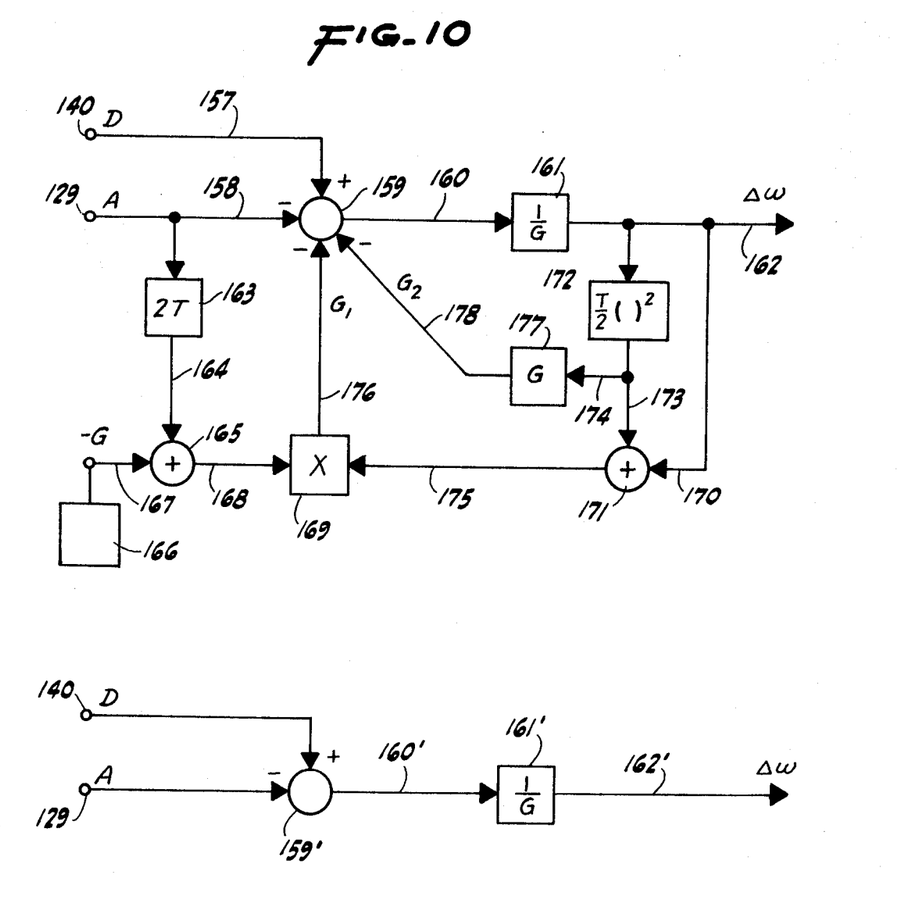
FIG. 10 is a block diagram of a high accuracy computer for use with the circuits of FIG. 8 or 9.

FIG. 10 is a block diagram of a high-accuracy computer which can be used with FIG. 8. It is based on the following relations in FIG. 8:

Let $\omega = \Omega + \Delta\omega$
where $\Omega = 1/T$.
Also let $K = k$.
Then $$D = \frac{K 1.5 V^2 (1 + 2T\Delta\omega + T^2(\Delta\omega)^2)}{2 + 2T\Delta\omega + T^2(\Delta\omega)^2}$$

and $$A = \frac{K 1.5 V^2}{2 + 2T\Delta\omega + T^2(\Delta\omega)^2}$$

and $$\frac{KT 1.5 V^2 (\Delta\omega)\left(1 + \frac{1}{2}\Delta\omega\right)}{1 + T\Delta\omega + \frac{1}{2}T^2(\Delta\omega)^2}$$

Eliminating $V^2$ $$D - A = 2AT(\Delta\omega)\left(1 + \frac{T}{2}\Delta\omega\right)$$

Let $G$ be a constant very near to the expected value of $2AT$. Solving for $\Delta\omega$ in terms of the difference between $G$ and $2AT$, $$G\Delta\omega\left(1 + \frac{T}{2}\Delta\omega\right) = G\Delta\omega\left(1 + \frac{T}{2}\Delta\omega\right)$$
$$= 2AT\Delta\omega\left(1 + \frac{T}{2}\Delta\omega\right) + (D - A)\Delta\omega$$
$$= \frac{D-A}{G} - \left(\frac{2AT-G}{G}\right)\left(\Delta\omega + \frac{T}{2}(\Delta\omega)^2\right) - \frac{T}{2}(\Delta\omega)^2$$

Let two small correction terms be $C_1$ and $C_2$.

$$C_1 = (2AT - G)\left(\Delta\omega + \frac{T}{2}(\Delta\omega)^2\right)$$
$$C_2 = \frac{T}{2}G(\Delta\omega)^2$$

Then
$$\Delta\omega = (1/G)(D - A - C_1 - C_2)$$

This is computed in FIG. 10(a).

When $\Delta\omega$, the frequency deviation from $1/T$, is small and $(2AT - G)$ is also small, then $\Delta\omega$ is approximately equal to $(D - A)/G$. This is computed in FIG. 10(b).

In FIG. 10, circuit 157 is connected to circuit 140 from FIG. 8 and carries the signal $D$. Circuit 158 is connected to circuit 129 from FIG. 8 and carries the signal $A$. Circuits 157 and 158 provide inputs to a summer 159 with positive and negative polarities respectively. The output of summer 159 is circuit 160 which is the input to gain block 161 with gain constant of $1/G$. The output of block 161 is circuit 162 carrying the useful output signal $\Delta\omega$ which is the deviation of the angular velocity from $1/T$.

Circuit 129 also provides an input to gain block 163 with gain constant of $2T$. The output of gain block 163 is circuit 164 which is one input to a summer 165.

A zener diode reference power supply 166 delivers a signal of magnitude $-G$ on circuit 167 which is another input to summer 165. The output of summer 165 on circuit 168 is the signal $(2AT - G)$ and is one input to an operational multiplier 169. The output circuit 162 is connected by circuit 170 to one input of summer 171. Output circuit 162 also provides an input to a squaring module 172 with gain constant $T/2$. The output of squaring module 172 on parallel circuits 173 and 174 is signal $(T/2)(\Delta\omega)^2$ and circuit 173 forms another input to summer 171. The output of summer 171 is circuit 175 which is the other input to multiplier 169. A circuit 176 is the output of multiplier 169 and carries the correction signal $C_1$ to summer 159 where circuit 176 enters summer 159 with a negative sign.

Circuit 174 is the input to gain block 177 with gain constant $G$ and output circuit 178 which carries the correction signal $C_2$. Circuit 178 enters summer 159 with a negative sign.

It can be seen that FIG. 10a calculates $(\Delta\omega)$ exactly with improved accuracy over FIG. 8 because the multiplier and square module are receiving only small deviation signals and do not need to handle the large signal $\omega$.

A simplification of FIG. 10a is shown in FIG. 10b in which like reference numerals are used as in FIG. 10a but with primes. In the circuit of FIG. 10b signals $C_1$ and $C_2$ are not computed. $(\Delta\omega)$ on circuit 162 is highly accurate so long as $C_1$, $C_2$ and $(2AT - G)\Delta\omega$ are each small compared to $2AT(\Delta\omega)$.

I claim:

1. An improved tachometer for measuring the velocity of a rotating shaft comprising a multiphase alternating voltage generator coupled to the rotating shaft and adapted to generate a multiphase alternating voltage, and squaring function means for deriving from said alternating voltage an essentially ripple-free signal which is proportional to the velocity of the rotating shaft.

2. The apparatus of claim 1 wherein said means for deriving from said alternating voltage an essentially ripple-free signal comprises a multiphase squaring function means responsive to said alternating voltage for producing a unidirectional output, and means responsive to said unidirectional output for performing order-independent, iterative, pair-wise, binary operations for generating said ripple-free signal.

3. The apparatus of claim 2 wherein said means responsive to said unidirectional output for performing order-independent, iterative, pair-wise, binary operations comprises a summer.

4. The apparatus of claim 2 wherein said squaring function means comprises a star-connected square law rectifier and wherein said means responsive to said unidirectional output is the summer in said star-connected square law rectifier.

5. The apparatus of claim 1 wherein said squaring function means comprises a plurality of non-linear circuit elements producing an output signal approximately proportional to the square of the instantaneous magnitude of said alternating voltage and wherein said ripple-free signal is responsive to said output signal.

6. An improved tachometer for measuring the velocity of a rotating shaft comprising an alternating voltage generator coupled to the rotating shaft, said alternating voltage generator having a rotating flux field and multiple armature windings for generating a plurality of sinusoidal voltages, computer means for calculating a plurality of signals proportional to the squares of said sinusoidal voltages, and summer means for adding together said plurality of signals to produce a first output signal proportional to the square of the angular velocity of the shaft.

7. The apparatus of claim 6 including means responsive to said first output signal for calculating the square root of said first output signal to produce a second output signal proportional to the angular velocity of the shaft.

8. The apparatus of claim 6 including dynamic filter means energized by said sinusoidal voltages and adapted to deliver filter signals to which said computer means are responsive.

9. The apparatus of claim 8 wherein said dynamic filters are low pass filters.

10. The apparatus of claim 8 wherein said dynamic filter means are high pass filters.

11. The apparatus of claim 8 wherein said dynamic filter means includes both low pass and high pass filters.

12. The apparatus of claim 6 in which said armature windings carry terminal currents and produce terminal voltages and including means for conducting secondary currents proportional to said terminal currents through a plurality of impedences, means for producing a plurality of secondary voltages proportional to said terminal voltages, and means for adding respectively said plurality of secondary voltages to the voltage drops in said plurality of impedences to generate the said plurality of sinusoidal voltages.

13. The apparatus of claim 12 in which said impedances are resistances.

14. The apparatus of claim 12 in which said impedances are inductances.

15. An improved tachometer for measuring the angular velocity of a rotating rotor comprising an alternating voltage generator coupled to said rotor, said generator having a magnetic field and an armature winding whose terminals have a terminal sinusoidal voltage and whose winding carries a terminal current through the winding impedance, computer means for calculating a first signal voltage responsive to said terminal voltage, means for calculating a second signal voltage responsive to said terminal current and proportional to the product of said terminal current times said winding impedance, means for generating a third signal voltage with both phase and frequency proportional respectively to the angular phase and frequency of rotation of said magnetic field by adding said first and second signal voltages, and means for computing an output signal responsive to the angular frequency of said third signal voltage.

16. The apparatus of claim 15 in which said armature winding is multiphase, said terminal voltage is multiphase, and said third signal voltage is multiphase.

17. The apparatus of claim 15 in which said magnetic field is produced by a permanent magnet.

18. The apparatus of claim 15 in which said magnetic field is produced by a direct-current excitation winding.

19. The apparatus of claim 15 in which said means for computing an output signal comprises a frequency meter responsive to the frequency of said third signal voltage.

20. The apparatus of claim 15 in which said means for computing an output signal comprises filter means responsive to said third signal voltage to produce a fourth signal voltage, and combining means responsive to both said third and said fourth signal voltages to produce said output signal.

21. An improved tachometer for measuring the velocity of a rotating rotor comprising an alternating voltage generator coupled to the rotating rotor, said generator having an exciting field and multiple armature windings, said multiple armature windings having winding impedances carrying terminal currents and having terminal sinusoidal voltages, means for conducting secondary currents proportional to said terminal currents through a plurality of impedances proportional to said winding impedances to produce a plurality of voltage drops, means for producing a plurality of secondary voltages proportional to said terminal sinusoidal voltages respectively, means for producing a plurality of computed sinusoidal voltages proportional to the addition respectively of said plurality of voltage drops to said plurality of secondary voltages, said computed sinusoidal voltages having both phase and frequency proportional respectively to the angular phase and frequency of rotation of said exciting field, and means responsive to the angular frequency of said computed voltages to deliver an output signal responsive to the angular velocity of said rotor.

22. A method for measuring the velocity of a rotating shaft comprising the steps of generating a multiphase alternating voltage by means coupled to the rotating shaft and deriving from said multiphase alternating voltage with a squaring operation an essentially ripple-free signal which is related to the velocity of the rotating shaft.

23. The method of claim 22 in which said step of deriving from said alternating voltage an essentially ripple-free signal includes the step of performing order-independent, iterative, pair-wise binary operations on said alternating voltage for generating said ripple-free signal.

24. The method of claim 22 in which said step of deriving from said alternating voltage an essentially ripple-free signal includes the steps of squaring each phase of said alternating voltage to produce a plurality of squared signals and operationally summing said squared signals to form said ripple-free signal.

25. A method for measuring the velocity of a rotating shaft comprising the steps of generating an alternating voltage and an alternating current by means having a magnetic field and armature windings and coupled to the rotating shaft, deriving a first signal voltage from said alternating voltage, deriving a second signal voltage from said alternating current which is proportional to a product of the alternating current times winding impedances, adding said first and second signal voltages to produce a third signal voltage having both phase and frequency proportional respectively to the angular phase and frequency of rotation of said magnetic field, and measuring the frequency of said third signal voltage to produce an output signal proportional to the velocity of the rotating shaft.

* * * * *